Feb. 2, 1932.  G. E. SMITH  1,843,906
METHOD OF MAKING WHEELS AND WHEEL BLANKS FORMED THEREBY
Filed Oct. 11, 1929   7 Sheets-Sheet 4

INVENTOR
Grant E. Smith
BY
Emery, Booth, Varney & Whittemore
ATTORNEYS

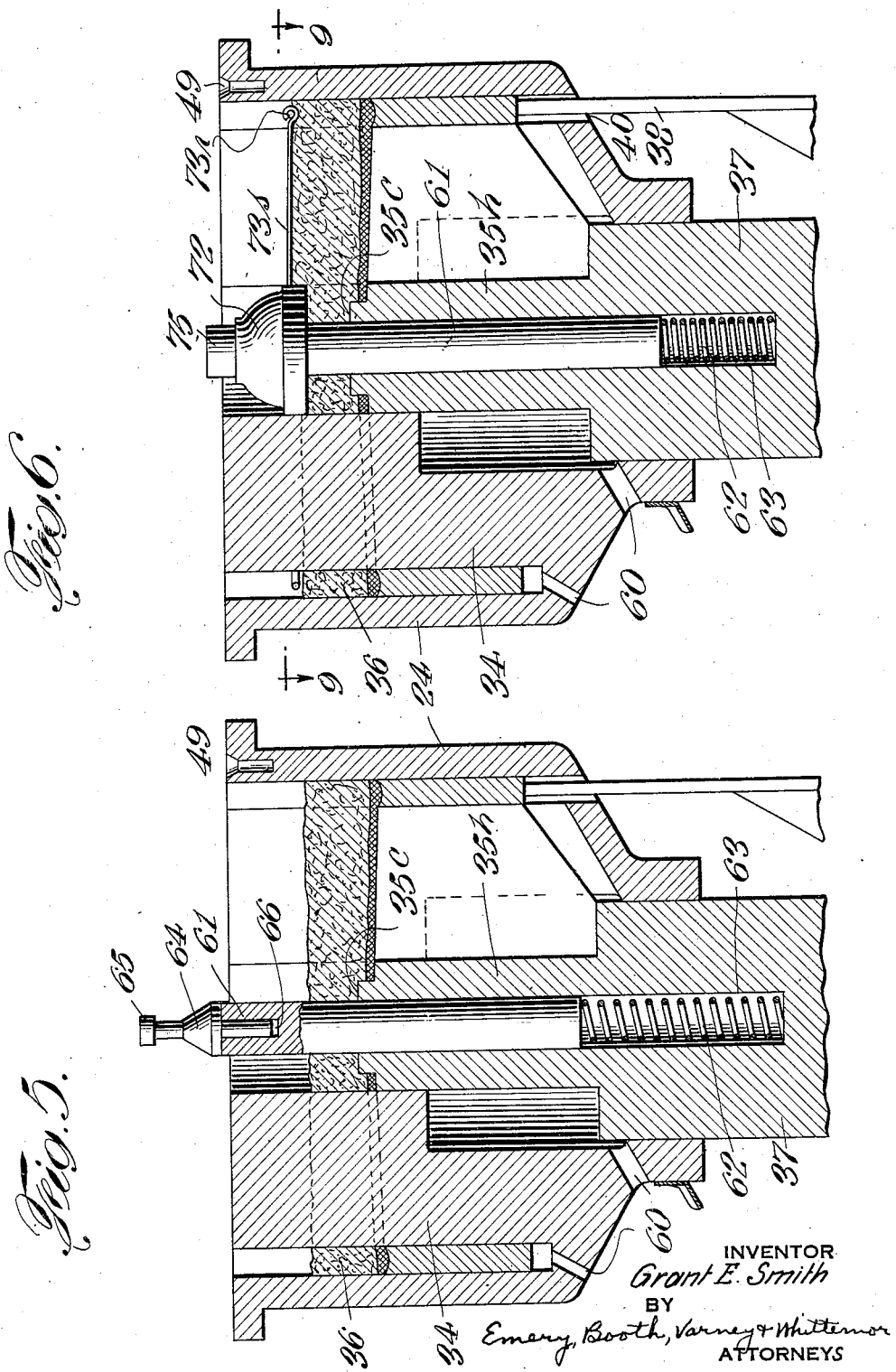

Feb. 2, 1932. G. E. SMITH 1,843,906
METHOD OF MAKING WHEELS AND WHEEL BLANKS FORMED THEREBY
Filed Oct. 11, 1929

INVENTOR
Grant E. Smith
BY
Emery, Booth, Varney & Whittemore
ATTORNEYS

Feb. 2, 1932.  G. E. SMITH  1,843,906
METHOD OF MAKING WHEELS AND WHEEL BLANKS FORMED THEREBY
Filed Oct. 11, 1929   7 Sheets-Sheet 7
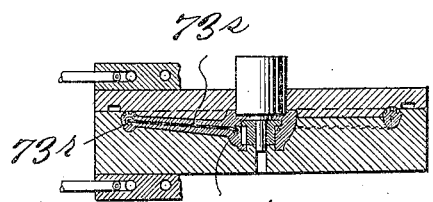
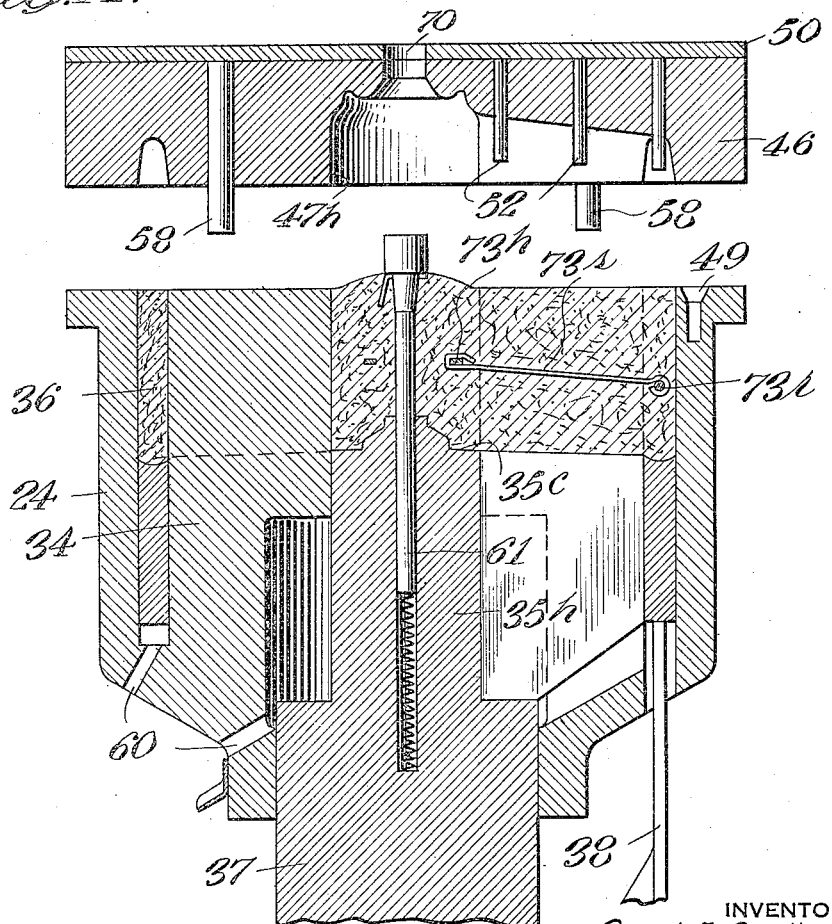
INVENTOR
Grant E. Smith
BY
Emery, Booth, Varney & Whittemore
ATTORNEYS Patented Feb. 2, 1932

1,843,906

UNITED STATES PATENT OFFICE

GRANT E. SMITH, OF POUGHKEEPSIE, NEW YORK, ASSIGNOR TO POUVAILSMITH CORPORATION, OF POUGHKEEPSIE, NEW YORK, A CORPORATION OF NEW YORK

METHOD OF MAKING WHEELS AND WHEEL BLANKS FORMED THEREBY

Application filed October 11, 1929. Serial No. 398,870.

This invention relates to the manufacture of wheels from moldable material and has for an object the production of a superior product in an economical and expeditious manner.

The invention has been developed in the manufacture of spoked steering wheels and for the purpose of furnishing a ready understanding of the invention, but without intention of unduly limiting the interpretation of the invention, the description will now be directed specifically to the manufacture of spoked steering wheels as a concrete illustration of the invention.

For many years there has been a constant endeavor to build steering wheels which would be comfortable to the hand and neat in appearance yet strong and rigid and economical to produce. It was thought that a heavy metal spider was the only structure which would furnish the indispensable strength and rigidity. But such a wheel is uncomfortable to the hand and not of the desired appearance. The constant effort to supplant it is manifested by the numerous patents on jointed wheels of wood and other materials.

In prior patents and applications I have disclosed methods of manufacturing wheels from moldable material which in the finished stage were without joints yet which met all of the requirements of appearance, feel, strength and rigidity. In making such wheels by these methods it is necessary in one way or another to form a blank for the final mold which will form all portions of the wheel. Sometimes the blank was formed by bending and jointing blocks of material, sometimes by winding or otherwise forming laminated material into relatively dense shapes. All such methods entailed much labor and waste of material and were correspondingly slow and expensive.

According to the present invention, the enumerated and other difficulties are avoided by forming the blank from loose conglomerate material of heterogeneous shape and size, such for example, as dust, pulp, shavings, chips, chopped sheets and the like which may be readily introduced into a blanking press of large initial volume. In the blanking press this loose material is compressed into a coherent unitary or monolithic wheel blank which will fit into a final mold in which it is further compressed and molded to form the finished wheel. Thus, although the original material may be of great volume and arranged in no required order, it is presented to the final mold in the shape and size best suited to economical and expeditious manufacture.

The method is especially adapted to the manufacture of reticulated articles such as spoked wheels in which reinforcement is embedded in the molded material, for the reinforcement may be incorporated in the blank between charges of the loose material. The wheel blank illustrated herein has such reinforcement. In application Serial Number 398,868, filed October 11, 1929, the apparatus for forming the wheel is described and claimed.

In the accompanying drawings which illustrate the invention:

Figure 5 is a partial enlarged vertical section taken at one stage in the filling of the press container;

Figure 6 is a similar view at another stage;

Figure 10 is a vertical section of a finished wheel in the finishing mold; and

Figure 11 is a partial enlarged view similar to Figure 1 showing the manufacture of a modified form of wheel.

Figure 1:
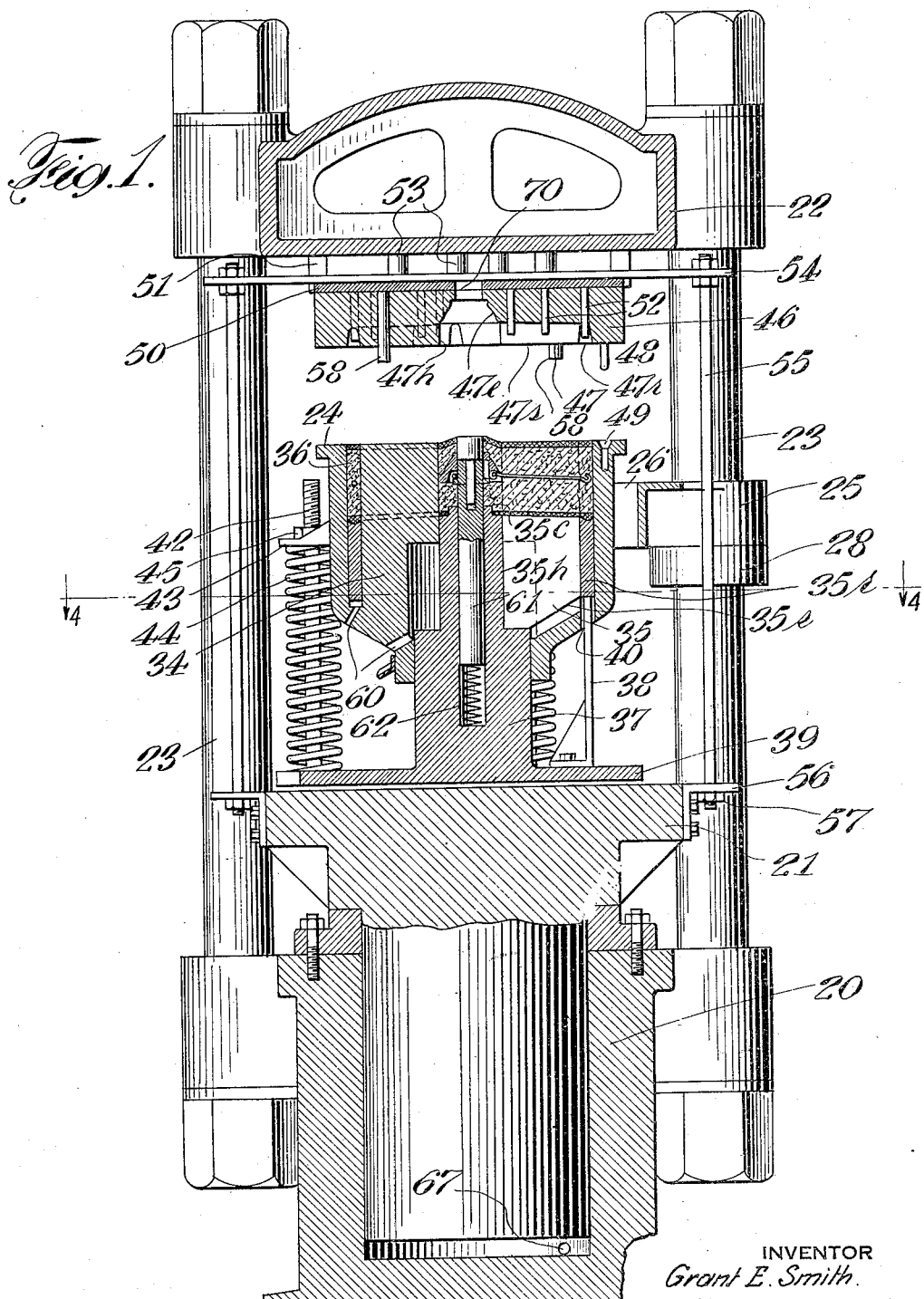
Figure 1 is a vertical section of a press suitable for carrying out the invention, the view being taken on line 1—1 of Figure 2.
Figure 2:
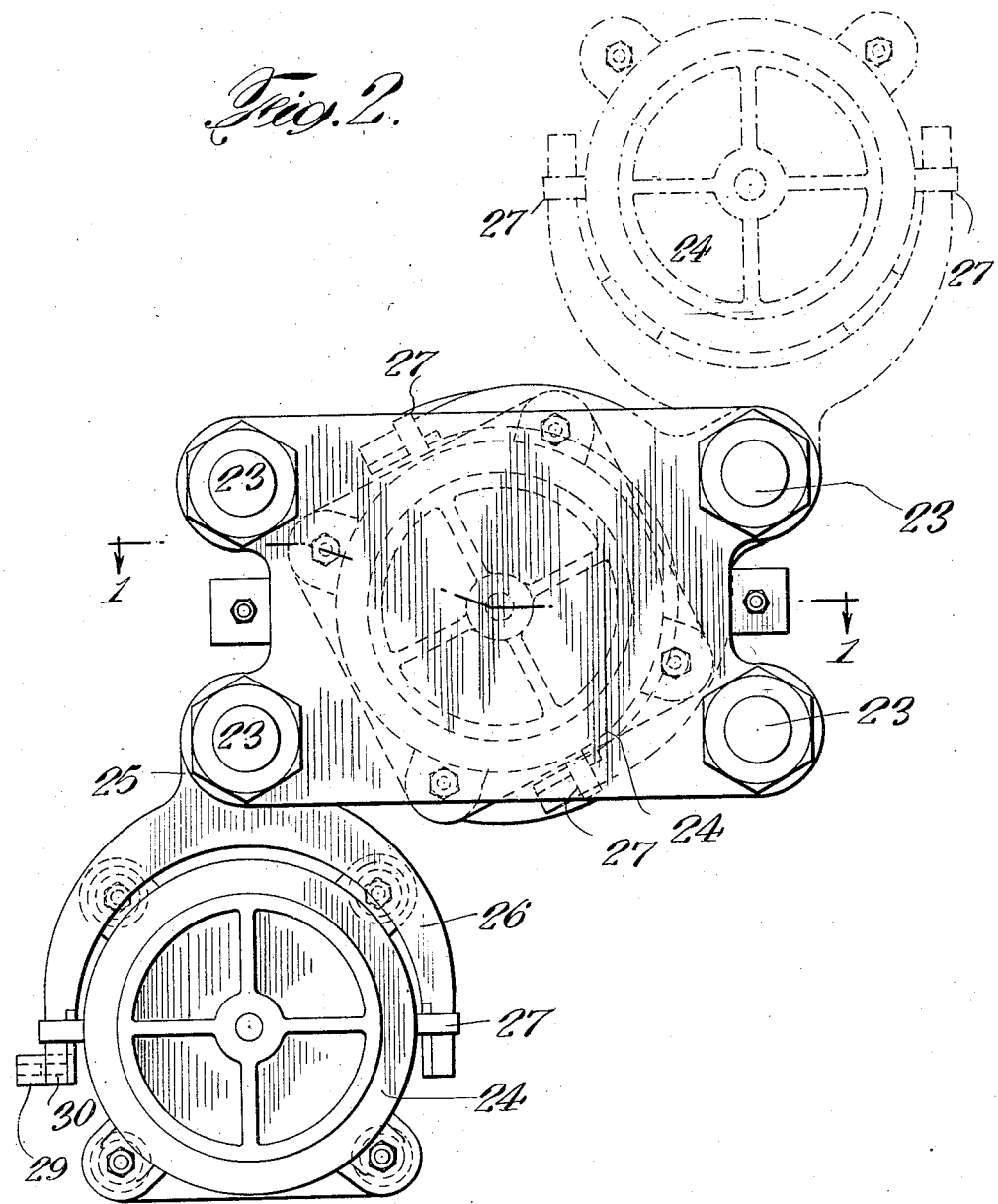
Figure 2 is a top plan view.

The preferred apparatus or blanking press for carrying out the invention, as best shown in Figure 1, comprises a hydraulic cylinder 20, a ram including a platform 21 actuated by a piston working in the cylinder, and a head 22 connected to the cylinder 20 by tension rods 23. One or more containers or pots 24 is slidably and swingably mounted on the rods 23 by bearings 25 provided with arms 26 supporting the container upon trunnions 27 (see Fig. 2). In the present apparatus there are two containers convenient for the use of two operators—one on either side of the machine—but more or fewer containers may be provided if desired. Collars 28 rigid with the rods 23 limit the lower position of the containers so they will swing clear of the top of the platform when down. To assist the operator in swinging the container, a handle 29 may be pivoted by a pin 30 which allows it to be raised to a horizontal position.

Figure 4:
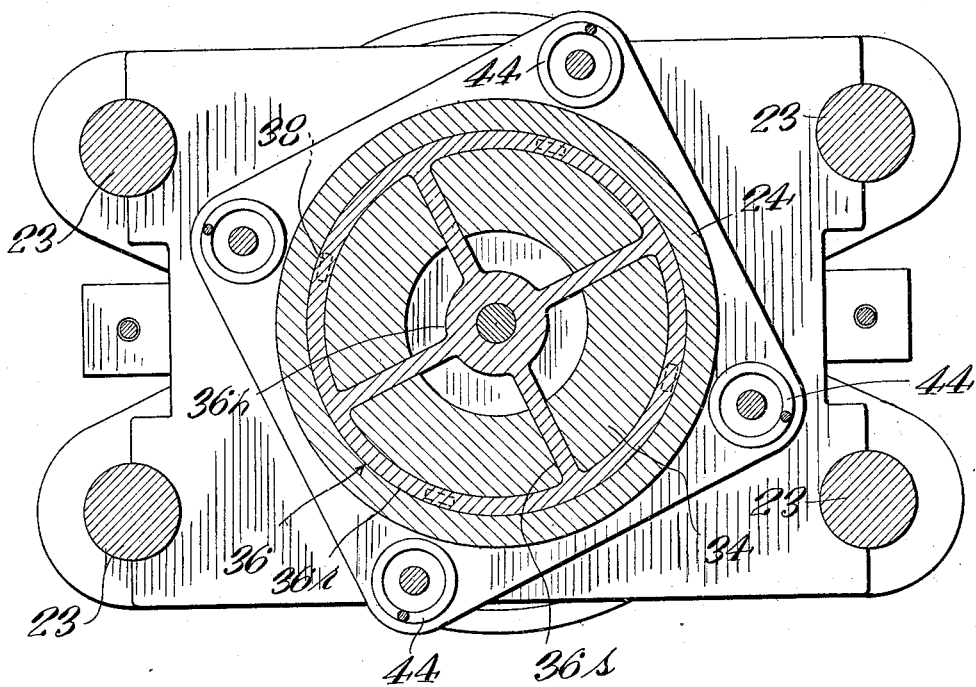
Figure 4 is a horizontal section on the line 4—4 of Figure 1.
Figure 8:
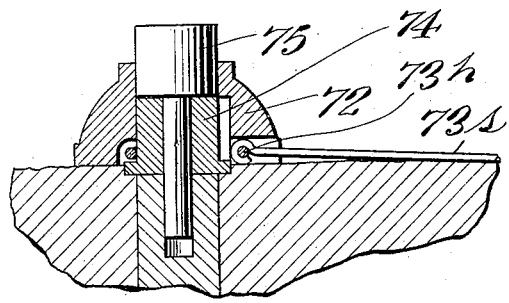
Figure 8 is a partial section taken just behind the plane of Figure 6;

The container assembly comprises the container 24 and a plunger 35 adapted to travel through the container cavity 36. As seen in Fig. 4, the cavity is in the cross-sectional shape and size of the wheel blank to be formed and includes a rim portion 36$r$, spoke portions 36$s$ and a hub portion 36$h$. The portions are separated to form the reticulated blank by spaced sectors of metal 34 secured to the bottom of the container. The plunger 35 likewise has the cross-sectional shape of a wheel blank and closely fits the container cavity, having corresponding rim portion 35$r$, spoke portions 35$s$ and hub portion 35$h$.

The rim portion 35$r$ of the plunger is made quite deep to take the heavy pressures imposed and the webs 35$s$ joining the rim portion and the hub portion 35$h$ are likewise made deep and sloping at the bottom edge for greater strength. The hub portion and the inner ends of the spoke webs are secured to a central plunger rod 37, which fits in an enlarged bore in the container. This central construction amply supports the hub portion and inner ends of the spoke portions of the plunger but if the depth of the rim portion is not such as to give it sufficient rigidity it may be supported between the spoke webs by auxiliary plunger rods 38 secured to a base plate 39 to which the central plunger rod is secured. Holes 40 are provided in the bottom of the container to slidably receive the rods 38.

The plunger is secured to the container by bolts 42 attached to the base 39 and slidably passing through ears 43 on the container. A spring 44 embracing the bolts 42 and pressing against the base and ears distends the container and plunger tending to keep the plunger in the bottom of the container cavity. A nut 45 on each bolt limits the separation of container and plunger. By adjustment of the nuts against the springs the normal space in the container cavity above the plunger for the reception of moldable material may be varied to suit materials of different varieties and various degrees of compressibility. For very light loose material of large volume the nuts may be let off to place the plunger in the very bottom of the container cavity to accommodate the maximum volume of material; for denser material the nuts may be taken up to raise the plunger in the cavity to take a smaller volume of material.

Cooperating with the container when it is swung "in the press", is a mold 46 secured beneath the press head 22 in alignment with the platform 21. The mold has a cavity 47 which comprises a rim portion 47$r$, spoke portions 47$s$ and a hub portion 47$h$ which at the lower edge exactly corresponds to the size and shape of the cavity in the container. The mold cavity is rounded at the bottom somewhat and the side walls slope slightly to assist ejection of the wheel blank from the cavity after compression. In case the wheel is designed to have an axial extension the mold cavity is made with a corresponding hub depression 47$e$. Likewise, if the wheel is to have a hub cavity, the plunger is provided with an extension 35$c$ to form the cavity.

Means is provided for accurately registering the container cavity and mold cavity when brought together. This comprises an end-tapered dowel 48 on one (the mold as shown) and a conical-mouthed hole 49 in the other.

Means is provided for ejecting the wheel blank as a unit from the mold cavity after compression therein. As shown in Figure 1, an ejector plate 50 is mounted in slots 51 in the head 22 and is provided with a plurality of ejector pins 52 judiciously scattered over the entire area of the cavity so as to press evenly on all parts of the blank. The mold is united to the head at numerous places across the plate by solid metal spacers 53.

Disposed across the plate is a bar 54, also movable in the vertical slot, and rigidly attached at its protruding ends to actuating rods 55. The rods at their lower ends pass loosely through holes in brackets 56 secured to platform 21 and are provided on their ends with nuts 57 below the brackets. Thus the platform is perfectly free to move upward without acting upon the rods and ejector plate but comes against the nuts 57 to carry the plate down with it near the end of its return stroke. In this construction the ejector pins and plate are moved upward by material being compressed in the mold cavity but do not offer any appreciable obstruction thereto such as would cause the pins to make holes in the blank because there is very little weight on the pins at this time. The whole weight of platform and associated parts is effective for ejecting the blank but only the weight of plate, bar 54 and rods 55 rests on the pins and blank on the upward stroke. If this weight is objectionable, lift pins 58 may be attached to the plate to be engaged by the top surface of the container just before the container comes against the mold to lift the ejector plate and pins before any material is pressed into the mold cavity.

To prevent material which may get past the plunger from collecting in the bottom of the container cavity to restrict the retraction of the plunger, vent holes 60 may be provided from the cavity through the bottom of the container.

Ordinarily it is desirable to form a hub bore through the wheel for attaching it to a shaft. For convenience this bore is formed when the blank is formed. For this purpose a hub pin 61 is placed in a well 62 formed in the hub portion 35h of the plunger. A light spring 63 supports the hub pin to normally hold it in elevated position but there is a very slight friction between the pin and the well surface so that the pin will tend to remain in whatever position to which it may be moved by the operator.

The method of making a simple wheel blank of uniform density of rim, spokes and hub, without hub cavity or hub extension and without reinforcement will be described first. The container being swung out and empty, the operator pulls the hub pin 61 up to the position shown in Figure 5 and places a conical pin 64 having, if desired, a lift knob 65 into a hole 66 in the upper end of the hub pin. The conical pin aids in inserting material into the container cavity.

The operator then takes enough loose material to form the wheel and pours it into the wheel cavity, spreading it evenly with his hands. The loose material may be powdered, shredded, chipped or in any form sufficiently small or flexible to be pushed into the cavity. Herein, the term "conglomerate" is used to denote loose compressible material of any size or shape suitable for easy introduction into the reticulated container cavity and without any ordered arrangement, i. e., "helter-skelter". Preferably the amount of material used for each wheel or portions of each wheel is weighed or otherwise measured so all wheels will be of uniform weight and density.

Preferably if fibrous material such as wood pulp, sawdust, shavings, excelsior or powdered, comminuted or shredded paper, fabric, board or like material is used it is first saturated with an adhesive, such for example, as a phenolic condensation product adapted to cure under heat and pressure to a hard, polished, waterproof body. Such an adhesive will in the final wheel cause all particles thereof to adhere to form a rigid strong wheel and will also form a smooth surface thereover.

Having filled the container cavity, the operator lifts the handle 29 and swings the container assembly into position between the platform and head-mold, a stop member of any desired kind being employed, if desired, to secure accurate positioning.

Hydraulic pressure is then admitted to cylinder 20 by way of inlet (and outlet) opening 67 (Fig. 1) to raise the platform 21. When the platform comes against the plunger base 39 of the container assembly it first raises the whole assembly—due to the strength of springs 44 distending the container and plunger—until the top of the container is tight against the bottom surface of the mold 46. As the container approaches the mold its upper surface engages the lift pins 58 to raise the ejector pins from the mold cavity. No material is pushed out of the container in this movement. As described, dowel 48 insures accurate registry of container and mold cavities.

Thereafter, additional hydraulic pressure is let into the ram cylinder to force the plunger through the container cavity to compress all of the material into the mold cavity to form a homogeneous, integral, one-piece or "monolithic" wheel blank which in cross section is slightly smaller than the finishing mold so as to be insertable therein. The upper end of the hub pin 61 or some part borne by it enters a hole 70 in the center of the mold to hold the pin vertical so that the wheel bore will be accurately located and so no material will be squeezed through the hole 70. The pressure is high enough to consolidate the material depending on its nature, being in some cases as much as 10,000 pounds per square inch.

After full compression, the hydraulic fluid is exhausted and the ram retracted. The wheel blank remains in the mold cavity until the ram has practically completed its withdrawal. Then the weight of the platform comes upon the ejecting pins as described above to press the blank evenly and without damage from the mold. The operator may catch it in his hands and lay it on top of the container after it is ejected. It might be marred if allowed to fall freely.

The container is then swung out, the blank removed and a new charge placed in the container.

The monolithic blank thus formed is placed in a heated mold and molded under heat and high pressure whereby it is further reduced in size and given a rigid set to form a strong, rigid wheel. With a blank thus formed, the final mold does not need to have a very deep cavity and several molds can be stacked in a single press to cure several wheels at once. The final molds may also be made very simply and moreover, no assembling of parts in or building up of a blank for the final mold is required, all of which promotes greater economies in manufacture.

In case portions of the finished wheel are to be deeper than others, more material may be placed in the blanking mold for those portions. One way of doing this is for the operator to pack the loose material down by hand in certain portions of the container cavity. This is usually required for the rim and hub since they are usually thicker than the spokes. Where a very deep hub (or other portions) is required, a pre-compressed filler may be used. Such a filler is used in the blank made in the press illustrated. It is best shown in Figures 1, 5, 6 and 8, where it is referred to by the character 72. The reason for these steps will be obvious when it is remembered that all parts of the plunger travel through the same length of stroke, and the normal tendency is to compress all portions of the wheel blank equally.

In case reinforcement is desired in the wheel, a portion of the loose material (about half as shown) is placed in the container cavity, then the reinforcement is put in, and then the cavity is filled to the top over the reinforcement. The reinforcement illustrated comprises an annular rim ring 73r, spoke rods 73s, a hub bushing 74 and a hub ring 73h. In placing this wheel assembly in the container, the conical pin 64 is removed when the container is half full of loose material and the bushing placed on the top of the hub pin 61. The bushing will have the hub ring placed thereon and, where the rim ring, spoke rods and hub ring are a unit as here, the whole reinforcing frame is placed on the bushing at once.

Then a cylindrical headed pin 75 is inserted through the bushing into the bore of the hub pin 61 and the hub pin and all parts carried thereon pushed down against the light spring 63 until the reinforcing frame rests on top of the loose material in the cavity. Care, of course, is taken to see that all the reinforcing parts are spaced sufficiently from the container walls so as not to be exposed or to lie near enough the surface to mar the appearance of the final finished wheel. It is one of the advantages of the present invention that dislocation of the reinforcing can be detected in most cases in the blank which assures a greater percentage of perfect finished wheels. The pre-formed hub filler piece 72, which is suitably shaped and notched to fit the bushing and spoke rod assembly, is then put on and the cavity filled to the top.

Figure 7:
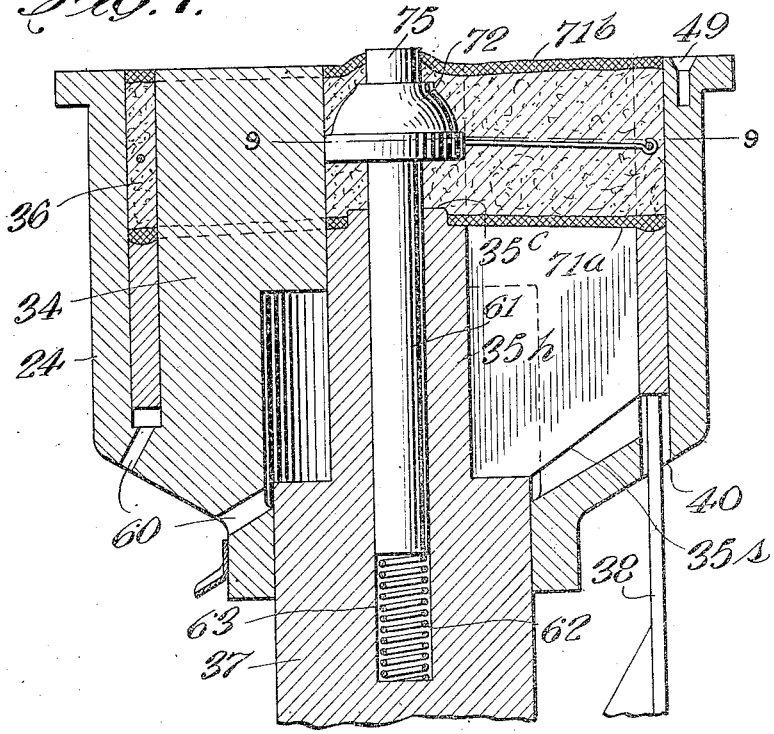
Figure 7 is an enlarged view of a portion of Figure 1.
Figure 9:
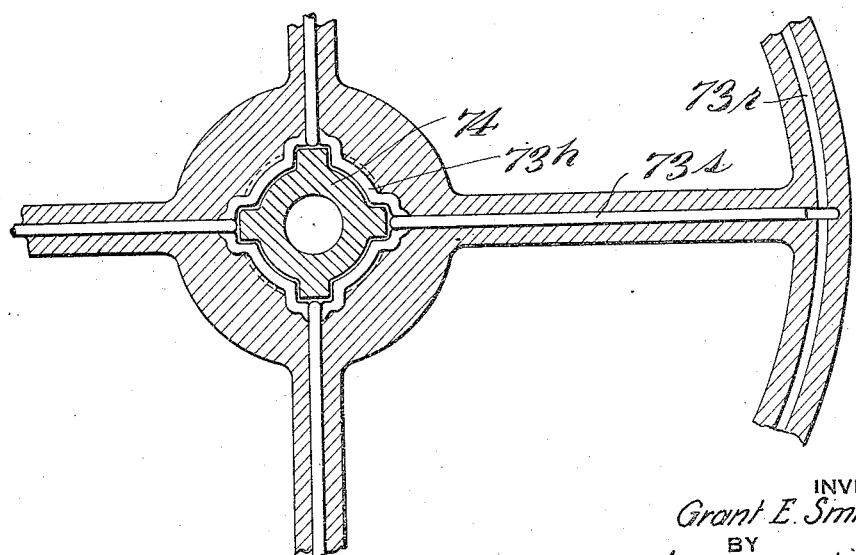
Figure 9 is a horizontal section of the wheel blank alone on the line 9—9 of Figure 7.

In certain cases it is desirable to use better than usual material for some or all of the exposed surface of the wheel. This may conveniently be done by putting different grades of material into the mold in layers. For example, in Figure 7 there is shown a bottom layer 71a and a top layer 71b of superior moldable material while the layer between may be the usual or an inferior grade of moldable material. The general horizontal disposition and approximately flat bottom surfaces of the container aid in the proper placing of the superior moldable material. It is preferably in finely powdered condition and so tends to flow toward low places.

In particular the present method of making the wheel aids in obtaining a satisfactory coating of finished material on the surface of the hub extension for it is put on when the hub extension is disposed above the wheel. Were it to be made lowermost the finish material would have to be placed in the corresponding cup-shaped cavity of the metal mold which has smooth sides so all the finish material would settle to the bottom.

In the compressed blank the separated layers of finish material are pressed closer together. In the final wheel the layers are pressed still nearer together and the heat flows the material completely about the wheel surfaces and also causes some of it to impregnate the moldable material beneath the surfaces, i. e., the material which in the container constituted the intermediate layer, in the final wheel constitutes the core.

In Figure 11 there is illustrated a wheel which has a shorter hub extension than is shown in the other figures. Such a wheel may be made without using the pre-formed hub filler 72. By packing material into the container at the hub and, if desired, by heaping the material up somewhat at the hub, the proper density may be secured without the hub filler.

Figure 3:
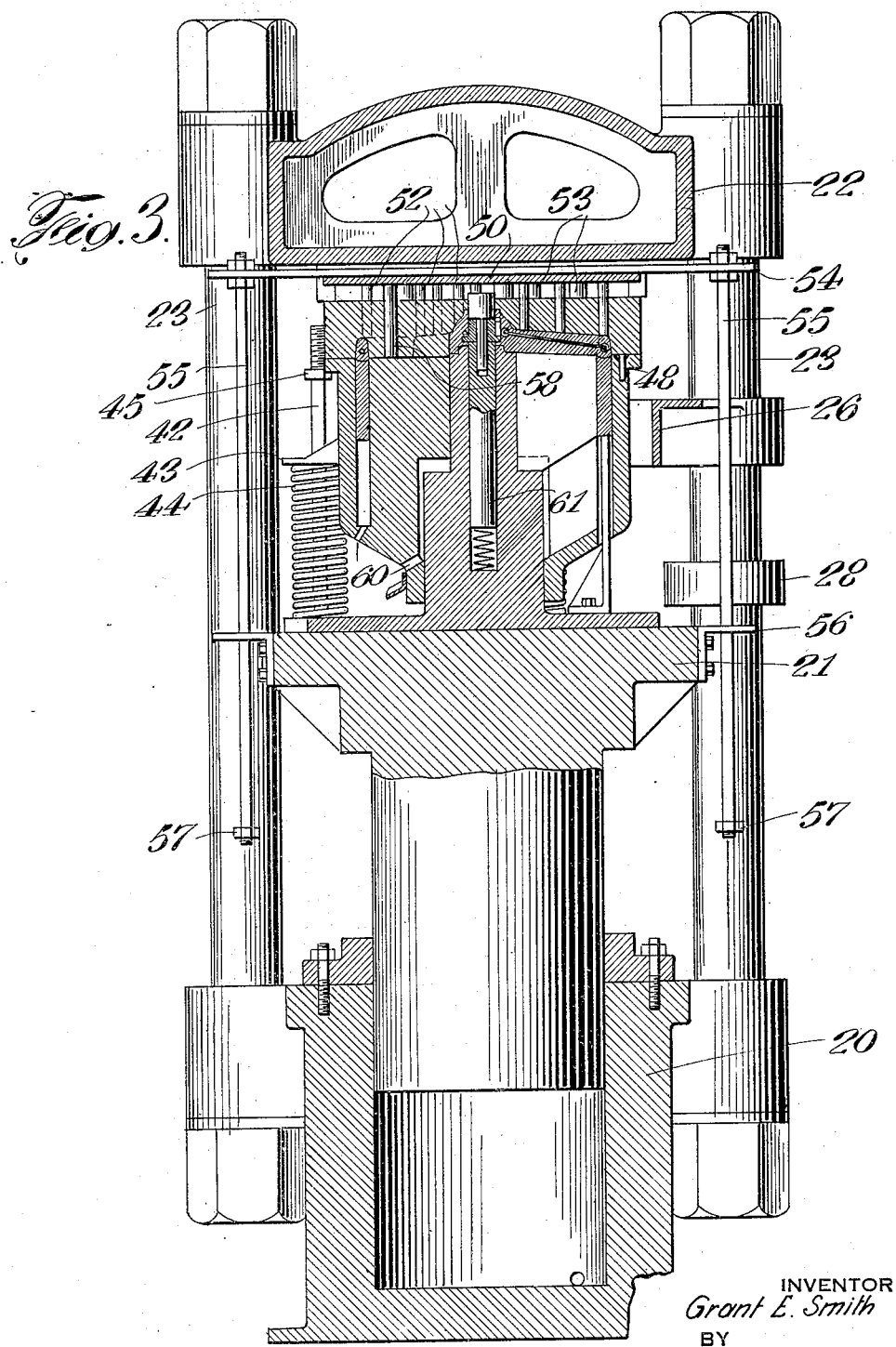
Figure 3 is a section similar to Figure 1 but showing the press closed;

By comparing Figure 3 and Figure 10 it will be seen that another aid in securing proper density of the several portions is utilized in addition to packing material in certain portions of the mold. The spoke portions in the finished wheel seen in Figure 10 are relatively much thinner than the rim and hub portions. The spokes, however, are left nearer their original width than the rim while the rim is squeezed in toward the center and also has numerous handgrip indentations formed on its lower surface. The net result is that there is a tendency toward equalization of the final density of parts although in the blank, the thickness of rim and spokes was approximately equal.

From the above description it will be seen that the method employed effects a great improvement in the art by reason of forming a complete wheel blank in a single pressing operation. The blank also has its benefits and advantages whether or not it is made exactly in accordance with the method set forth above. Other advantages will be apparent to those skilled in the art from the above description.

One material advantage is derived from the ability of the loose material to flow into the cavities and joints of the reinforcing elements to form a better bond, which produces a better finished wheel.

Another advantage is that any dislocation of reinforcement or material may be detected in the intermediate product—the blank—which assures a greater percentage of perfect finished wheels. If a fault appears in the blank the material may be broken up and re-used, if in the finished wheel, all material and labor is lost.

While the description has been limited to certain concrete examples it is to be understood that various changes and modifications may be made within the scope of the subjoined claims.

What I claim is:

1. The method of making a spoked wheel of moldable material with a metal reinforcement embedded therein which comprises partly filling a mold cavity having the shape of the wheel with moldable material while raising a central core member to maintain an axial opening for the wheel while filling, placing a reinforcing element upon the end of the core member, and subsequently securing an extension of the core member to the same above the reinforcing member, placing more moldable material upon the reinforcement, and molding the whole to compress and greatly reduce the size of the moldable material leaving the reinforcement near the center thereof.

2. The method as set forth in claim 1 in which a pre-compressed hub element is placed over the reinforcing element upon the core member before the core extension is introduced.

In testimony whereof, I have signed my name to this specification this 4th day of October, 1929.

GRANT E. SMITH.